(12) United States Patent
Roth et al.

(10) Patent No.: US 7,006,891 B2
(45) Date of Patent: Feb. 28, 2006

(54) FLATS BUNDLE PROCESSING SYSTEM

(75) Inventors: J. Edward Roth, Lansdale, PA (US); Bruce H. Hanson, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 72 days.

(21) Appl. No.: 10/778,360

(22) Filed: Feb. 17, 2004

(65) Prior Publication Data

US 2004/0162631 A1    Aug. 19, 2004

Related U.S. Application Data

(62) Division of application No. 10/245,380, filed on Sep. 18, 2002, now Pat. No. 6,714,834.

(51) Int. Cl.
*G06F 7/00* (2006.01)

(52) U.S. Cl. .................. 700/217; 700/218; 700/226

(58) Field of Classification Search ............... 700/217, 700/218, 223, 224, 225, 226; 209/542, 540, 209/584, 900
See application file for complete search history.

(56) References Cited

U.S. PATENT DOCUMENTS

| | | | |
|---|---|---|---|
| 4,653,963 A | 3/1987 | Taneda et al. | |
| 4,790,119 A | 12/1988 | McDaniels | |
| 5,118,243 A | 6/1992 | Huebner et al. | |
| 5,203,671 A | 4/1993 | Cawley et al. | |
| 5,211,702 A | 5/1993 | Tanaka | |
| 5,287,976 A | 2/1994 | Mayer et al. | |
| 5,415,518 A | 5/1995 | Montgomery | |
| 5,501,571 A * | 3/1996 | Van Durrett et al. | 700/217 |
| 5,656,005 A * | 8/1997 | Cummings et al. | 700/217 |
| 5,680,923 A | 10/1997 | Gram | |
| 5,713,713 A | 2/1998 | Syde et al. | |
| 5,772,383 A | 6/1998 | Kalika et al. | |
| 5,844,807 A * | 12/1998 | Anderson et al. | 700/217 |
| 5,906,468 A | 5/1999 | Vander Syde et al. | |
| 6,029,797 A | 2/2000 | Olsson | |
| 6,206,169 B1 | 3/2001 | Spatafora | |
| 6,217,274 B1 | 4/2001 | Svyatsky et al. | |
| 6,328,302 B1 | 12/2001 | Hendrickson et al. | |
| 6,336,782 B1 | 1/2002 | Pawlak et al. | |
| 6,598,748 B1 | 7/2003 | Mileaf et al. | |
| 6,601,847 B1 | 8/2003 | Hendrickson et al. | |
| 6,721,762 B1 * | 4/2004 | Levine et al. | 700/216 |

\* cited by examiner

*Primary Examiner*—Gene O. Crawford
(74) *Attorney, Agent, or Firm*—Greenblum & Bernstein, P.L.C.

(57) ABSTRACT

A processing system for automating the packaging, packing, unpacking, transfer/short term storage and loading of flats mail into flats sorters for sortation is disclosed. This involves bundling flats mail into bundles or logs and creating pallets for transporting in a standardized manner at mailer facilities such as publishers so that the sort depth and final destination of the bundle contents are preserved and used throughout its journey through postal facilities. Sort depth and destination bar coding is placed on each bundle. An automated method for palletizing involves creating a stack of bundles on a pallet in a predetermined sequence so that sorting processes in the postal facility become more efficient. Once the pallets are received at the postal facilities, the pallets are broken down in a pre-determined sequence in accordance with the sequence of original creation. The bundles are scanned into the sorter processes of the postal facility where the scanned information concerning destination codes and sort depth facilitates or eliminates routing and sorting within the postal facility, thereby reducing overhead and costs. A system to create pallets using both robotic and conveyor mechanisms is disclosed.

7 Claims, 11 Drawing Sheets

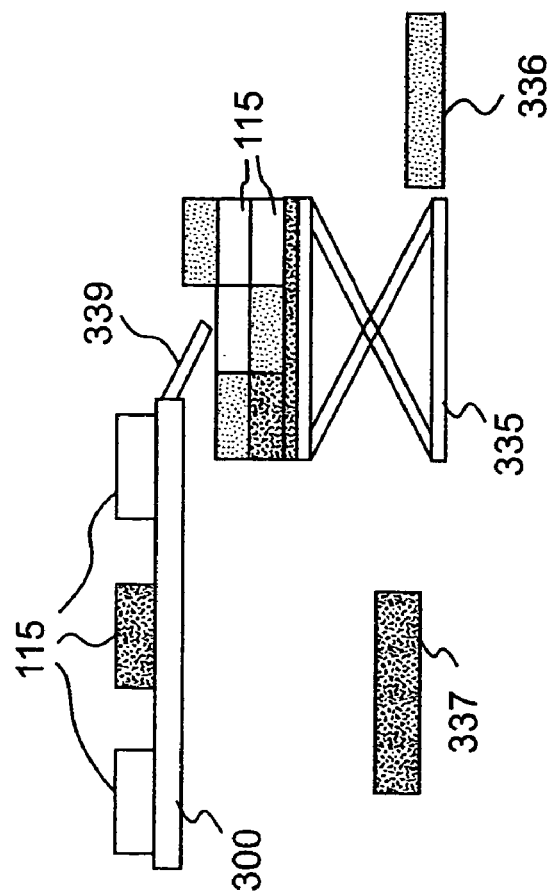
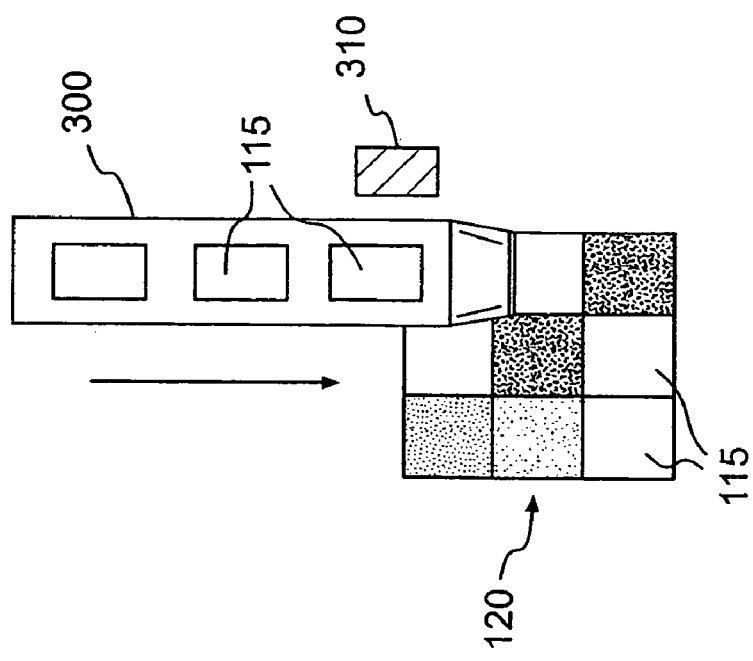
FIG. 3C
FIG. 3B

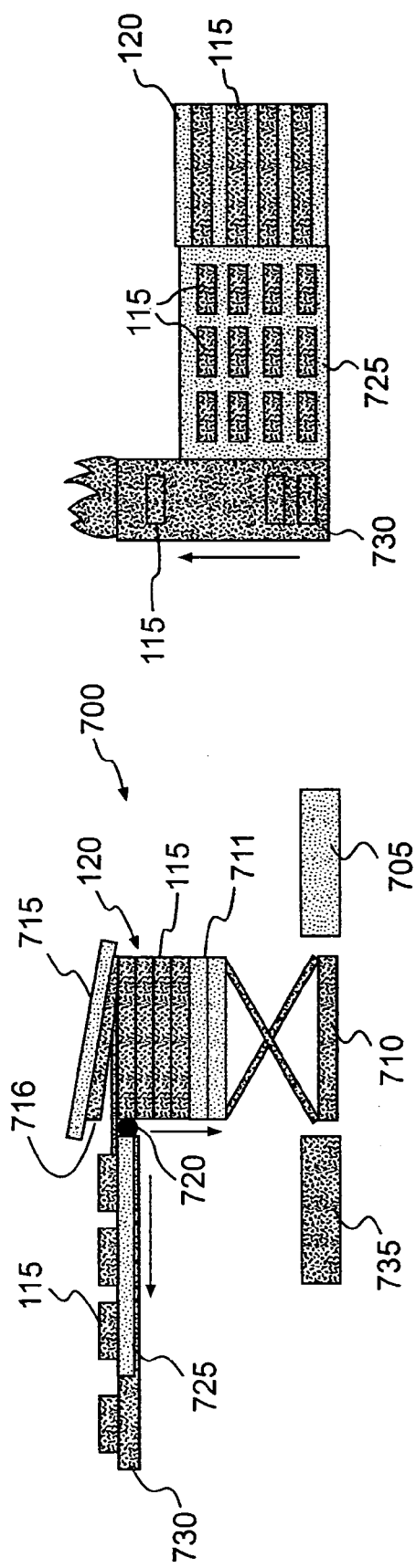

FLATS BUNDLE PROCESSING SYSTEM

CROSS REFERENCE TO RELATED APPLICATIONS

This application is a divisional application of U.S. patent application Ser. No. 10/245,380, filed Sep. 18, 2002, now U.S. Pat. No. 6,714,834, which is now incorporated herein by reference.

BACKGROUND OF THE INVENTION

1. Field of the Invention

The present invention generally relates to a material handling system and, more particularly, to a system for packaging, transporting and sorting mail and other material for routing and delivery.

2. Background Description

In most modern postal facilities, major steps have been taken toward mechanization (e.g., automation) of the delivery of mail, packages and other items. These machines and technologies include, amongst others, letter sorters, facer-cancelers, automatic address readers, parcel sorters, advanced tray conveyors, flat sorters, letter mail coding and stamp-tagging techniques and the like. As a result of these developments, postal facilities have become quite automated over the years, considerably reducing overhead costs.

However, large volume mailers such as publishers are still saddled with a long and involved process in their facilities that involve substantial labor to deliver flats (i.e., magazines, flyers, books, and the like) in a cost efficient manner. First, mail must be sorted to certain depths in order to obtain reduced postal rates, and this sorting process can involve many special considerations such as sorting by size and destination. But, the overhead involved with preparing large amounts of flats for mailing is often related to the rates that the mailer is attempting to achieve. For example, if there is a large amount of mail to one particular destination neighborhood, the mailer can attempt to pre-sort mail in a bundle for the neighborhood mail carrier, even sorting to a depth matching the sequence of the delivery route. This is among the lowest cost rates available. If the mailer actually delivers the sorted bundles to the appropriate neighborhood post office, the rates are even better.

However, there are a host of mailing rates and sorting possibilities that might affect the postal rates. By way of illustrations, mailers can elect to sort the mail or flats to various levels of granularity, or depth, depending on the costs and volumes involved. If mail is sorted to the level of a given central post office processing facility, it is one rate. If the mail it is further sorted to particular post office destinations, it is a better rate. If still the mail is sorted by a carrier route within a post office, it is yet a better rate.

However, the overhead to perform these types of sorting and packaging with accuracy and with flexibility is very labor intensive particularly when various shipping bundle sizes result, which can, in turn, aggravate the shipping process. More specifically, mail flats are typically bound together to facilitate shipping and handling. However, varying bundle sizes can result in the shipping becoming particularly inefficient. Moreover, current practice typically calls for rotating sections of flats within a bundle in order to keep the bundles of uniform length, overall. If the rotation does not occur, the spines or bound edges, which are thicker than the non-bound edges, may cause a "banana" effect or a tipping of the product when stacked at the publishing facilities. To ensure that the "banana" effect or tipping does not occur, the mailer will either tightly wrap the bundle or, more commonly, assemble the stacks of their product in a counter rotated bundle, i.e., with the bound edges rotated every so many pieces in order to maintain a straight stack. In the former stacking process, the product is bound so tightly with several straps, shrink wrap and the like that the product is damaged during the bundling and transportation process. By using the counter rotation procedure, however, a mail sorting facility, whether it be a postal facility or other delivery or transportation facility, must reorient the stacks so that all of the bound edges are aligned.

These bundles are typically stacked on pallets for mass transport to mail facilities. Because of the potential different bundle sizes or even with similar bundle sizes, the pallets themselves can be of unpredictable sizes with inconsistent packing arrangements that may not be easy to unpack at the postal facilities. These pallets are typically unloaded manually and then the bundles opened by hand for entry into the sorting processes at the mail facility. This is very labor intensive. Little standardization of the bundling and palletization currently exist.

The present invention provides solutions to the shortcomings of current mail handling processes.

SUMMARY OF THE INVENTION

In a first aspect of the present invention, a system for processing mail is provided. In this system a packing mechanism packages flats into one or more logged bundles and a stacking mechanism stacks the one or more logged bundles onto one or more pallets in a first sequence based on bundle information. A de-stacking mechanism breaks down the one or more pallets in a second sequence based on the bundle information. A transport system transports the one or more pallets from the stacking mechanism to the de-stacking mechanism. A controller controls at least one of (i) the stacking mechanism to load each of the one or more bundles in the first sequence based on at least bundle information and (ii) the de-stacking mechanism to unload each of the one or more bundles in the second sequence based on at least the bundle information.

In embodiments, a first conveyance mechanism conveys the bundles to the stacking mechanism and a second conveyance conveys the bundles away from the de-stacking mechanism and to either a bundle storage area for storing the de-stacked bundles or a flats sorter for sorting flats from the de-stacked bundles. In one embodiment, the stacking mechanism and the de-stacking mechanism comprises a robotic arm capable of lifting the one or more bundles. The robotic arm is controlled by a controller controlling the movement of the robotic arm to predetermined locations on predetermined pallets of the one or more pallets based on the bundle information. A counter may be provided for counting the one or more bundles moved by the robotic arm to the predetermined pallets. In another embodiment, the stacking mechanism and de-stacking mechanism may be a conveyor mechanism. In the de-stacking conveyor system, a lifting mechanism lifts a top layer of the bundles from the one or more pallets and tilts to form a gap between the top layer and a next layer of the one or more bundles. A laterally movable separator conveyor penetrates into the gap for moving the one or more bundles from the top layer.

In another aspect of the present invention, a control system controls the mechanism for stacking the one or more bundles onto the one or more pallets. The control system includes:

1. a first controller for storing bundle information associated with the one or more bundles;
2. a second controller for controlling a scanner which scans the bundle information;
3. a third controller for determining the availability and errant bundle information associated with the one or more bundles;
4. a fourth controller for controlling a moving mechanism to load each of the one or more bundles to a predetermined pallet or location based on the bundle information, availability and errant bundle information; and
5. a fifth controller for determining whether the pallet is full and, if so, determining a position of a non-filled pallet for moving a bundle of the one or more bundles.

The fourth controller, in embodiments, may also control the moving mechanism to move each of the one or more bundles to a predetermined location on the predetermined pallet. Additionally, the fourth controller may include a counter for counting each of the one or more bundles moved to the predetermined pallet in order to prevent over filling of the predetermined pallet, and when the predetermined pallet is full, it determines a new position for the predetermined pallet.

In yet another aspect of the present invention, a control system for controlling the breakdown of pallets into bundles is provided. In this control,
1. a first controller stores bundle information associated with the one or more bundles;
2. a second controller controls a scanner which scans the bundle information;
3. a third controller controls an unloading mechanism to move each of the one or more bundles to a predetermined conveyance system; and
4. a fourth controller determines whether the pallet is empty and moves the pallet to an empty pallet stack.

The fourth controller, in embodiments, determines whether there are any more pallets required to be broken down. If there are more pallets to be broken down, the fourth controller controls a mechanism for moving a next pallet proximate to the unloading mechanism.

In another aspect of the present invention, a method is provided for processing mail. The method includes the steps of building bundles, stacking bundles onto pallets, transporting the pallets and breaking down the pallets. In embodiments, the steps further include conveying the bundles to a bundle storage or a flats sorter, wherein the bundles are stored in the bundle storage or conveyed to the flats sorter based on the scanned information. If in the storage area, the bundles are retrieved, conveyed to the flats sorter and opened for extracting the flats for sorting. The bundles, in embodiments, are provided in a sleeve container, i.e., an L shaped or U shaped sleeve. When stacking the bundles, the bundles are scanned to obtain destination and sort depth information data as well as a host of other information.

BRIEF DESCRIPTION OF THE DRAWINGS

The foregoing and other objects, aspects and advantages will be better understood from the following detailed description of a preferred embodiment of the invention with reference to the drawings, in which:

FIG. 3B is a top view diagram of another palletizer machine embodiment of the present invention;

FIG. 3C is a side view diagram of the palletizer embodiment of FIG. 3B;

FIG. 4B is a side view diagram of another embodiment of a pallet breakdown machine of the present invention;

FIG. 4C is a top view diagram of the embodiment of a pallet breakdown machine of FIG. 4B;

DETAILED DESCRIPTION OF A DETAILED EMBODIMENT OF THE INVENTION

System Overview

Figure 1:
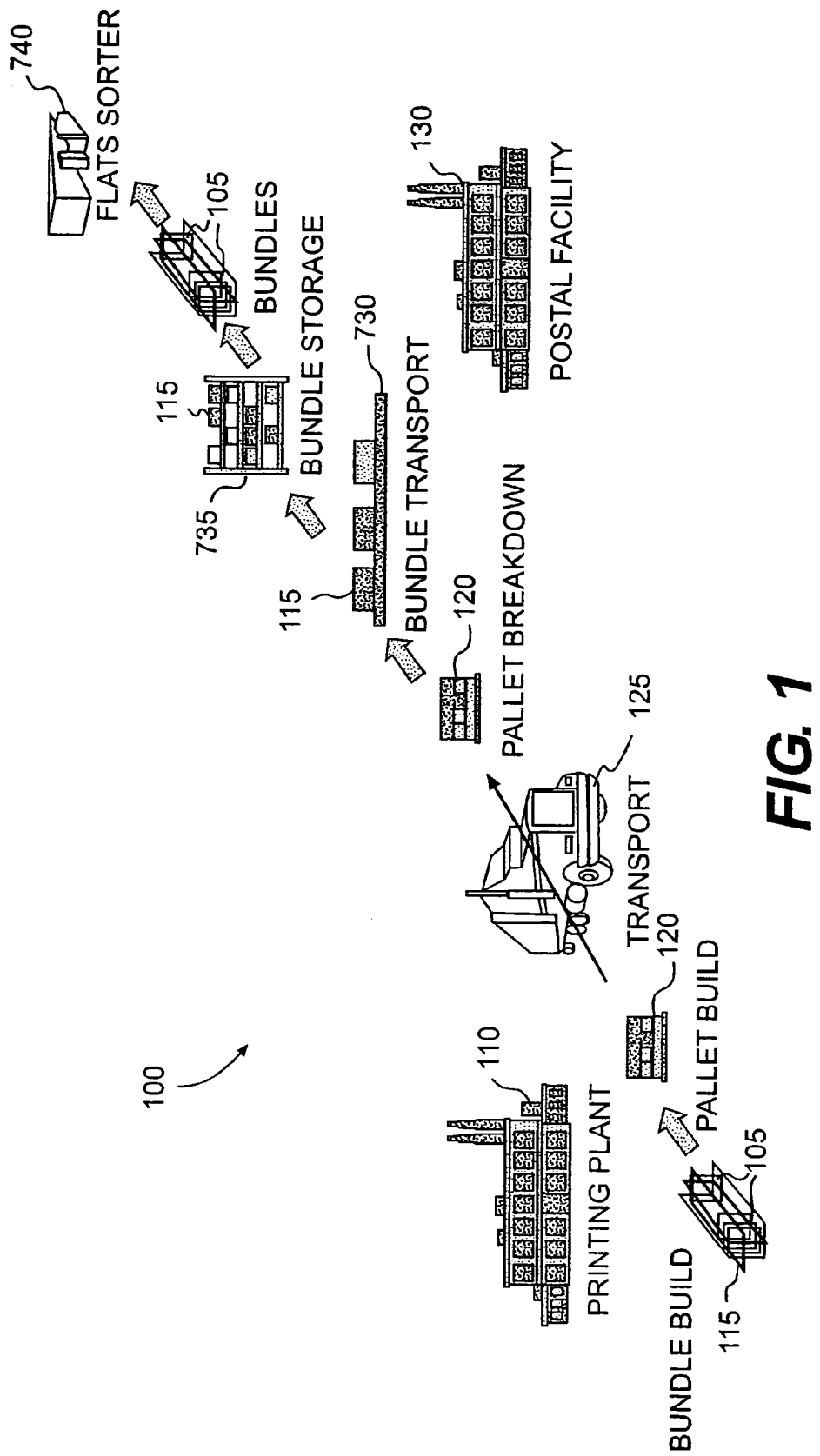
FIG. 1 is a general overview of the present invention.

The present invention is directed to a mail handling system and method of use. In FIG. 1, this overall system, generally denoted as 100, is depicted showing mail flats 105 from entities such as publishers 110, or other mailers, packaged to build a bundle 115. The bundle 115 is subsequently stacked in a predetermined manner to build a pallet 120 and transported by carrier 125 to a postal facility 130 for processing. At the postal facility 130, the pallet 120 is broken down and the bundles 115 are entered into the postal facility 130 on a bundle transport 730, typically a belt conveyor. The bundle may be temporarily stored in a bundle storage area 735 until operational demands within the postal facility 130 request the stored bundles 115. At that time, the bundles 115 are moved, typically by belt or roller conveyor, to a flats sorter 740 where the bundles 115 are unpacked, entered into the flats sorter 740 and sorted for future distribution.

System Components

Figure 2B:
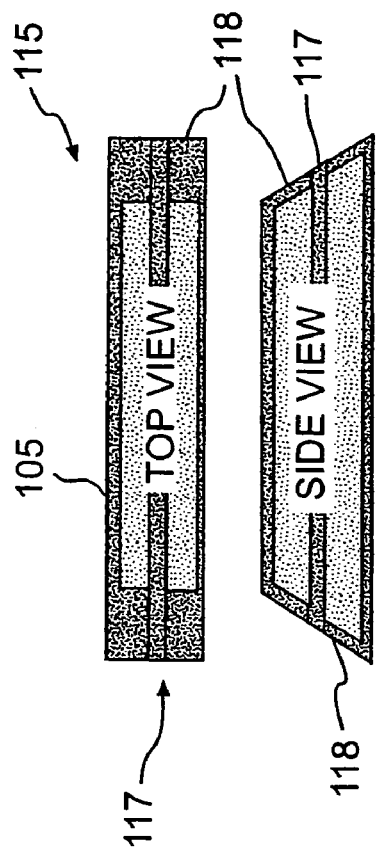
FIG. 2B is a top view and side view of a bundle.
Figure 2A:
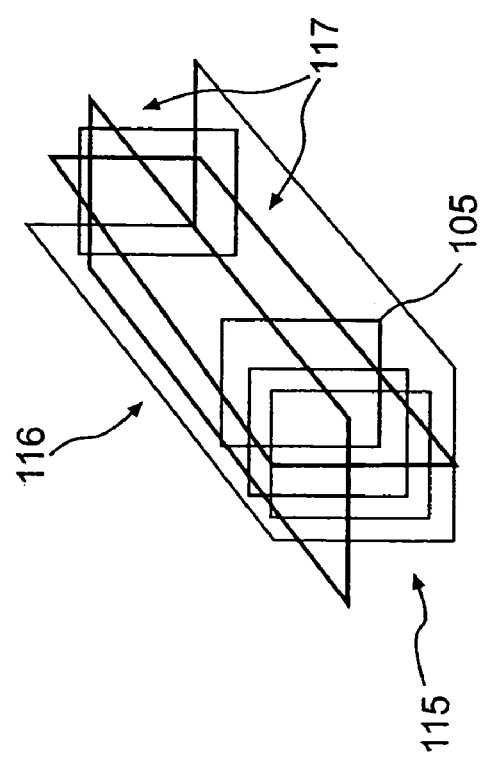
FIG. 2A is a perspective of a bundle of flats of the present invention.

Referring to FIGS. 2A and 2B, a standardized bundle 115 of the present invention is shown with the flats 105 placed onto a specially formed L-sleeve 116, which may also be a U-sleeve. The sleeve 116 is a container typically made from semi-rigid corrugated board or other formable material. The flats 105 are placed with the spines or bound edges of the flats against the interior of the L-sleeve 116 with an expectation that the flat's spines are downward when palletized and transported. The L-sleeve 116 is cut to bundle-length plus flap lengths with a slit on each end at the juncture of the L-sleeve sides in order that flaps 118 may be folded inwardly, both vertically and horizontally, on the ends of the bundle.

In one aspect of the present invention, the bundle 115 is built by a mechanism to a standard size by folding flaps 118 over the ends then wrapping the bundle 115 on four sides and two ends with straps 117. The bundle 115 is compressed during the wrapping process to provide a stable, tight package that can withstand rough handling. When the flats 105 are packed into the L-sleeve 116, the spines of the flats 105 are often not as compressible as the non-spine ends and leads to a difference in compression producing a sloped-end effect as shown in the side-view of FIG. 2B. The slopes may vary depending on the particular flats involved, but is not important to the understanding of the present invention. The bundle 115, in embodiments, is bar code tagged with the destination code and sort depth for the contents of the bundle 115 to be used by the postal service. The mailer's identification and bundle number may also be added. This coding is also used to aid in the palletization and shipping process both at the mailer's end and at the postal service end. Other coding schemes may also be employed. Once the flats 105 are compressed and wrapped to create standardized bundles 115, the bundles 115 are moved to a palletizing stage.

Figure 3A:
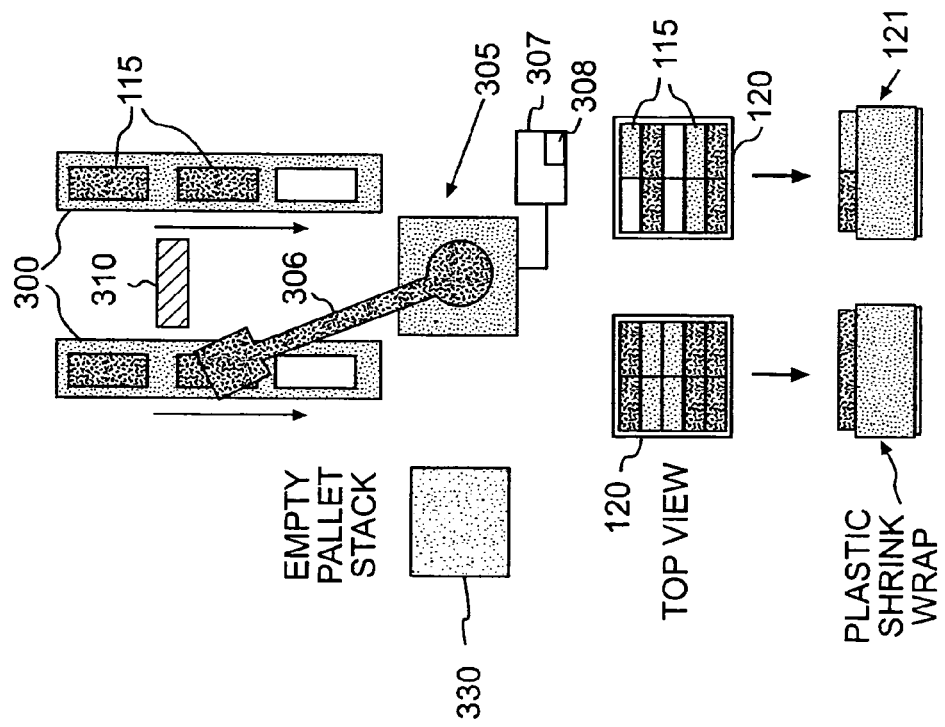
FIG. 3A is a diagram of a robotic palletizer machine embodiment of the present invention.

Referring to FIG. 3A, in an embodiment, the bundles 115 are typically moved along one or more conveyors 300 to a palletizing staging area where a robotic palletizer 305 lifts a bundle 115 from a conveyor 300 and is scanned by bar code scanner 310. A software-based stored-program controller (SPC) 307 with memory 308 controls the robotic palletizer 305 and is aware of destination codes and sort depth parameters from a database as established by the postal service. The SPC 307 also counts and keeps inventory of the bundles palletized and validates the bundle destination codes for the pallet 120 being built.

The robotic palletizer 305 is directed by the SPC 307 to lift the bundle 115 and place the bundle onto the pallet 120 in a particular location within the pallet build. The pallet 120 shows five layers, but any practical number is possible. In one embodiment, the robotic palletizer 310 may simultaneously build more than one pallet for different destination codes depending on the number of conveyors exposed to the palletizer staging area. The sequence and arrangement of the builds could be different, depending on destination or sort depth. Once a pallet is built, it is wrapped with a plastic shrink-wrap 121 or similar material, for example. Typically, each layer is wrapped individually; however, the entire pallet may be wrapped as a single unit. The wrapped pallet 120 is moved for transport and a new empty pallet is moved from the empty pallet stack 330 into place so that the robotic palletizer 310 can continue building pallets.

Another palletization embodiment is shown in FIGS. 3B and 3C. This embodiment uses a conveyor mechanism concept to build a pallet 120. A conveyor 300 delivers bundle 115 to a pallet build area. The bundles are scanned by scanner 310 to read the information associated with the bundle such as destination and sort depth. A palletizer lift 335 is computer controlled to move laterally in two dimensions so that the bundles can be dropped down shoot 339 into position to build a pallet 120. When a bundle is scanned, it signals the SPC 307 that a bundle is nearing a drop. Once a drop occurs, the palletizer lift 335 is moved to present the next drop position under the shoot 339. This may mean that the packetizer lift may move in a lateral and a vertical direction. This process continues until a pallet is full. The packing order is, in embodiments, a predetermined sequence under computer program control. A full pallet 120 is conveyed to the pallet output conveyor 336 by the packetizer lift 335. Other pallet transports can also be employed. Alternatively, the conveyor 300 may be the component, instead of the palletizer lift 335, that is moved to direct a bundle 115 onto the pallet 120. The shoot 339 may also be capable of lateral motion for the placement of a bundle 115.

System Components at Postal Facility

Figure 4A:
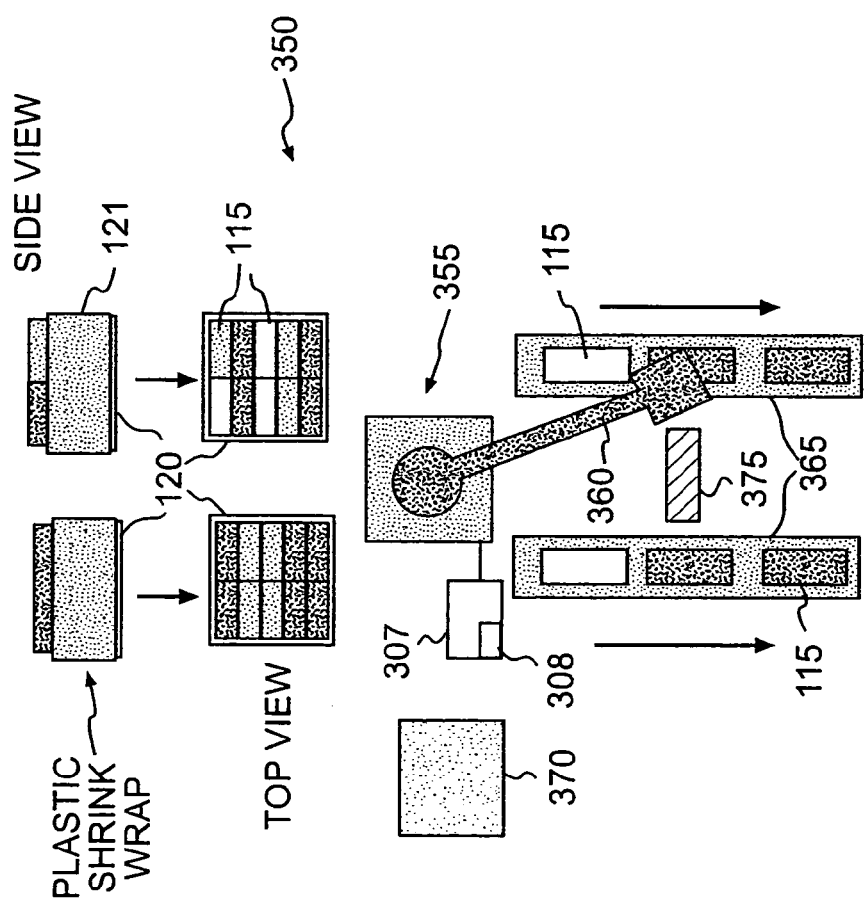
FIG. 4A is a diagram of a robotic pallet breakdown machine of the present invention.

FIG. 4A shows the pallet breakdown area, generally depicted as 350, usually at the postal facility 130. One or more pallets 120 with plastic wrap 121 are delivered to the pallet breakdown area 350 containing bundles 115 of flats 105. The plastic wrap 121 is removed usually one layer at a time. In an embodiment, the robotic pallet breakdown machine 355 unloads the bundles 115 under control of another SPC 307 at the postal facility 130. This SPC 307 is typically in communication with, or integrally a part of, overall postal facility process control computers. The pallet breakdown robotic arm 360 lifts the bundles 115 from the pallet 120 in a pre-determined sequence and corresponds to, for example, the reverse order in which the pallet 120 was built at the mailer's facility 110, and places the bundle 115 on an appropriate conveyor 365 line. Empty pallets are moved to an empty pallet stack 370. As bundles 115 are placed on an appropriate conveyor 365, a scanner 375, typically a bar code scanner, scans any bundle number, mailer's identification, destination code, and sort depth for the bundle 115. This information is maintained in the postal facility's stored process control database for subsequent sorting and routing of the bundle 115. This information is used to route the bundle 115 to an area in bundle storage 140 appropriate for the destination code of the bundle 115, or alternatively, to route the bundle 115 directly to an appropriate flats sorter 740 (FIG. 6) for further sorting of the flats 105. It is possible that the bundles 115 can be routed to another postal facility without being further sorted.

FIGS. 4B and 4C show another embodiment of a pallet breakdown mechanism generally denoted by 700. An optional pallet input conveyance 705 provides incoming pallets 120 to the pallet lift 710 under control of an SPC that is capable of receiving an incoming pallet from the pallet input conveyance 705. The pallet lift 710 may have a scissors lift action or equivalent motion, as necessary, and also has either rollers or a conveyor belt 711 to receiving the next pallet 120 from the pallet input conveyance 705. Once a pallet 120 is positioned on the pallet lift 710, the pallet lift 710 lifts the pallet 120 vertically until the top of the pallet 120 triggers a sensor of the depalletizer tilt head 715.

The depalletizer tilt head 715 provides several additional functions. It initially steadies the bundles 115 by placing pressure on the top layer of the pallet 120 and then squeezes one end of the top layer to help direct bundles 115 onto a separator conveyor 720. It then creates a vacuum suction though numerous vent holes in the lower side of the depalletizer tilt head 715 in order to raise the bundles slightly. Once the suction is applied, the depalletizer tilt head 715 tilts raising the layer of bundles to create a gap 716 so that the separator conveyor 720 can insert itself into the gap 716. The separator conveyor 720 is a laterally movable conveyor with a slim profile and with friction producing material on the rotating conveyor belt or panels of the separator conveyor 720. The friction producing material may include rubber-like ridges or teeth. The separator conveyor 720 slim profile permits deeper penetration into the top layer as the gap 716 is opened and the separator conveyor 720 rotation and insertion moves the bundles 115 off the pallet 120 onto the roller conveyor 725. The pallets are then moved along to a belt or roller conveyor 730 that has engaging segments and controls to evenly space the bundles 115 for transport to a bundle storage or directly to a flats sorter. A scanner (not shown) along the belt conveyor 730 scans the bundles 115.

Figure 5:
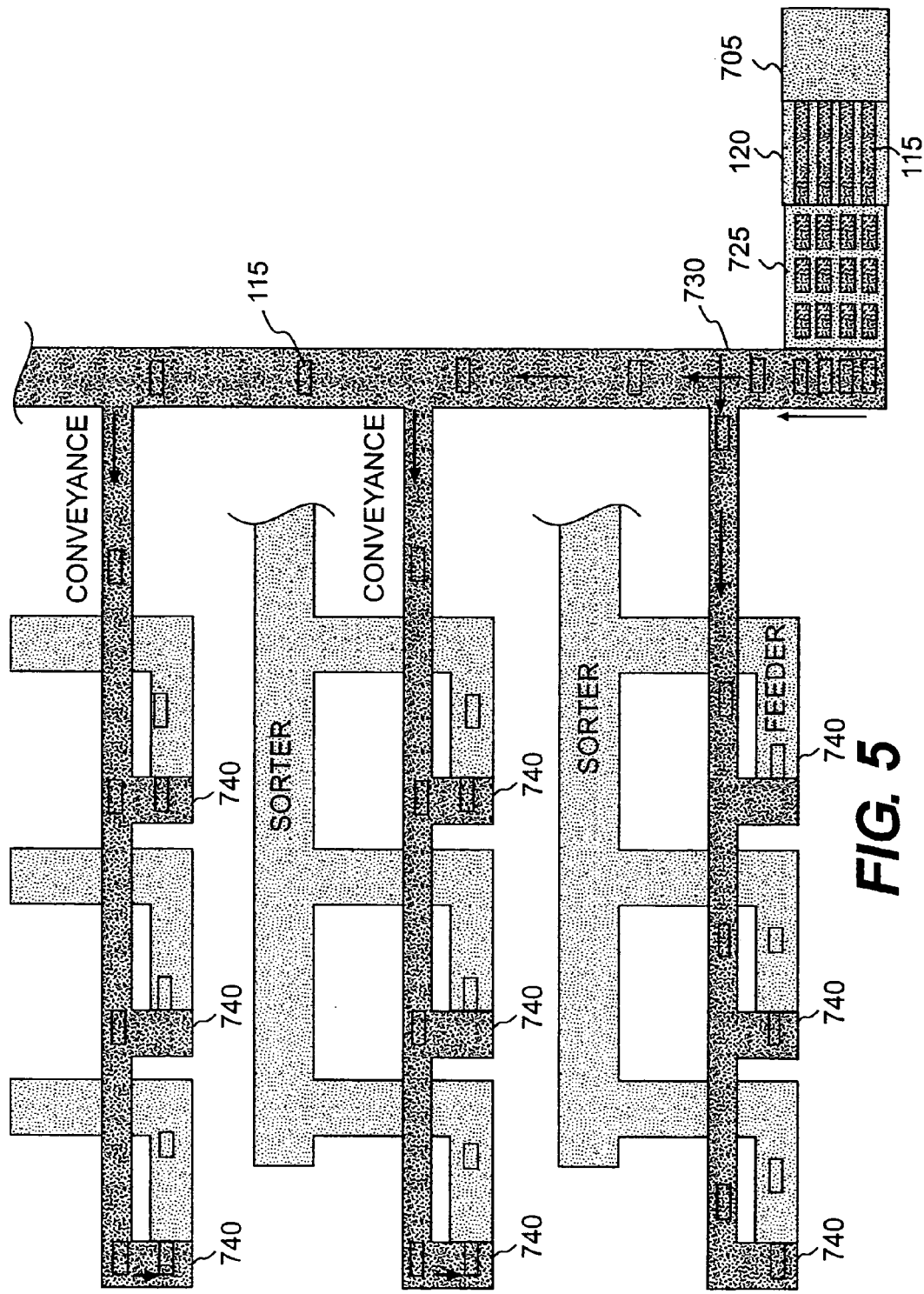
FIG. 5 is an overall representation of the flow of bundles in a postal facility according to the present invention.

FIG. 5 shows an overall representation of the flow of bundles in a postal facility using an pallet breakdown embodiment. The pallets 120 arrive by the pallet input conveyance 705 and are broken down. The bundles 115 are moved across the roller conveyor 725 to the belt conveyor 730 where the bundles 115 are spaced and scanned. The bundles 115 then are diverted based on the scanned information to an appropriate flats sorter feeder 740.

Figure 6:
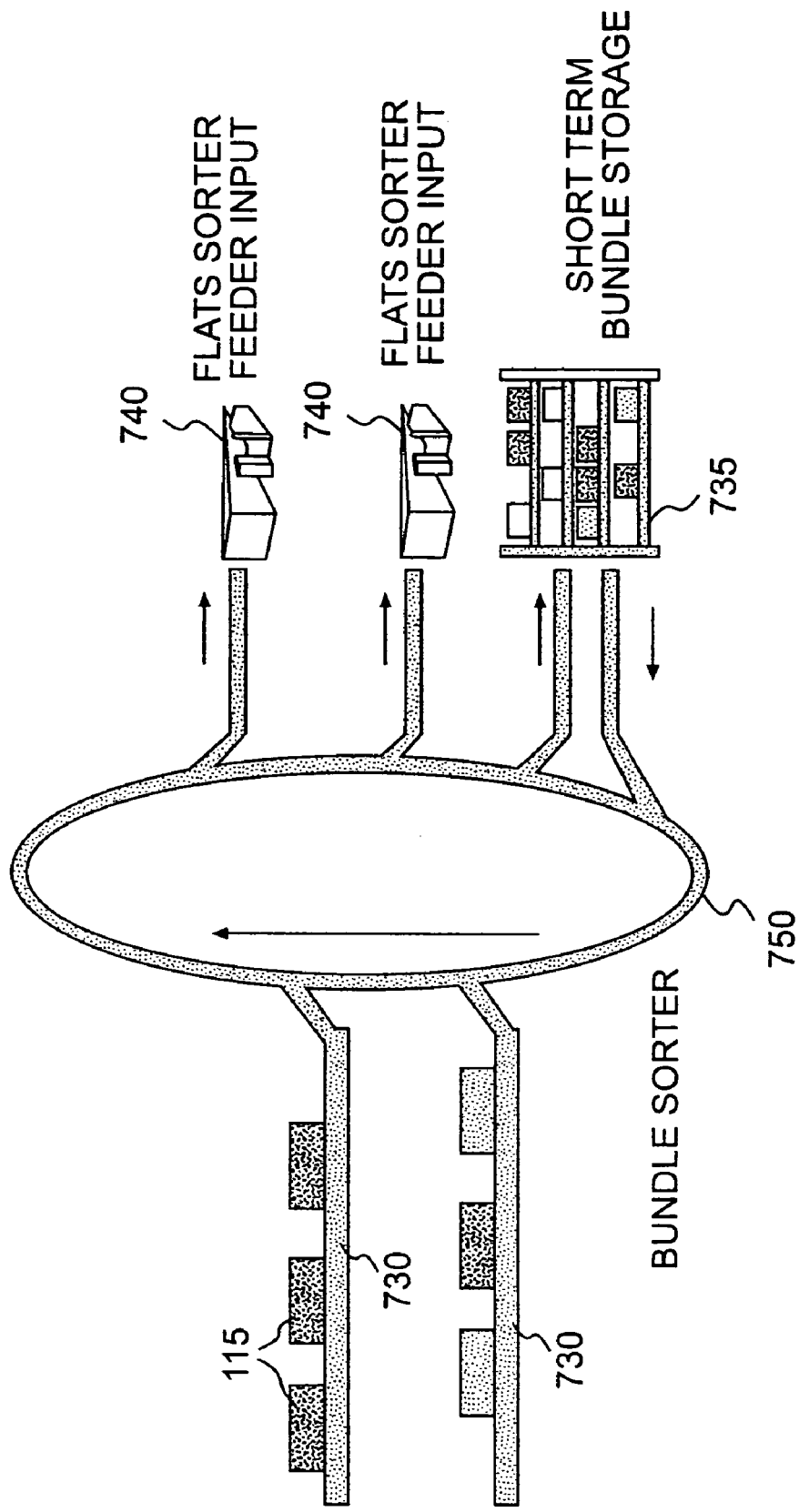
FIG. 6 is a diagram showing a bundle sort process including bundle storage and flats sorter feeders in a postal facility according to the present invention.

FIG. 6 depicts a bundle sorter 750 similar in operation to FIG. 5. In this embodiment, the bundle sorter 750 is an oval type conveyance system that routes the bundles 115 from the belt or roller conveyor 730 to the short-term bundle storage 735 or routed directly to one or more flats sorter feeder 740. The bundles 115 are retrieved from the bundle storage 735 when operational demands require the stored bundles. This bundle sorting is under control of a computer process control system, which controls the storage allocation of the bundles and maps the location of the bundles 115 to specific storage locations. The bundles 115 can subsequently be recalled by location based on previously scanned bundle information. The computer system keeps an inventory of the stored bundles and manages the anticipated storage needs based on daily operations projections.

Figure 7:
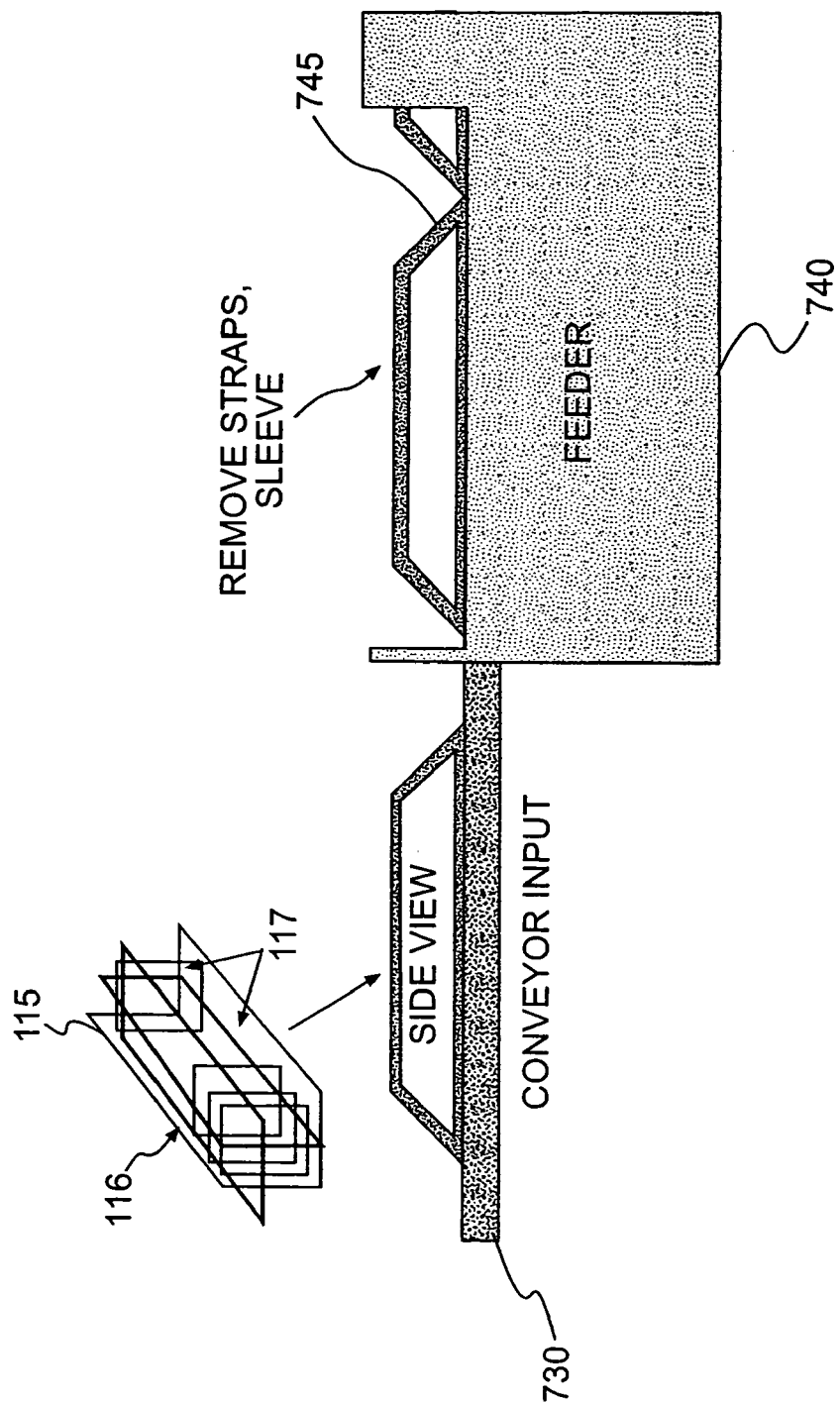
FIG. 7 is a diagram of a bundle arriving at a flats sorter feeder.

FIG. 7 shows a flats sorter feeder 740 receiving a bundle 115 via belt or roller conveyor 730. The bundle 115 can be re-scanned at this point. When the flats feeder sorter 740 is ready for the bundle 115, it is received in the flats feeder sorter shoot 745 where the straps 117 are removed and the flats extracted. The flats feeder sorter 740 then begins its process of further sorting the flats in the bundle, which is well known in the art.

System Use

The use of the system permits mailers such as publishers and advertisers to build standardized bundles of flats, and the like, on their premises in a fashion that permits the bundles to transit through postal processing facilitates with greater efficiencies and with much less labor content. The bundles are built in a pre-determined fashion as standardized size bundles/logs with identifying data bar coded on the wrapped bundle. The depth of sort and destination data coding is quite useful to achieve better postal rates. Depending on the level of sort performed at the mailer, the bundle will be subject to the proper additional sorting, if necessary, at the postal facility. The building of the bundle to a standard size and the resulting ability of the postal facility to take advantage of the standardized bundle provides a basis for cost efficiencies. The method of creating the bundles building the pallets and then breaking down the pallets by the pallet breakdown devices makes this possible.

Figure 8B:
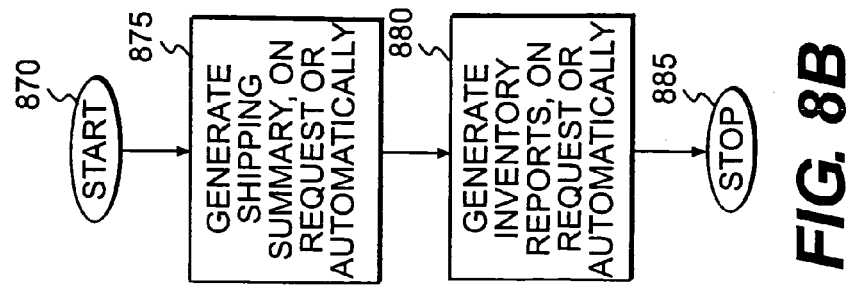
FIG. 8B is a flowchart showing steps to generate reports and summaries.
Figure 8A:
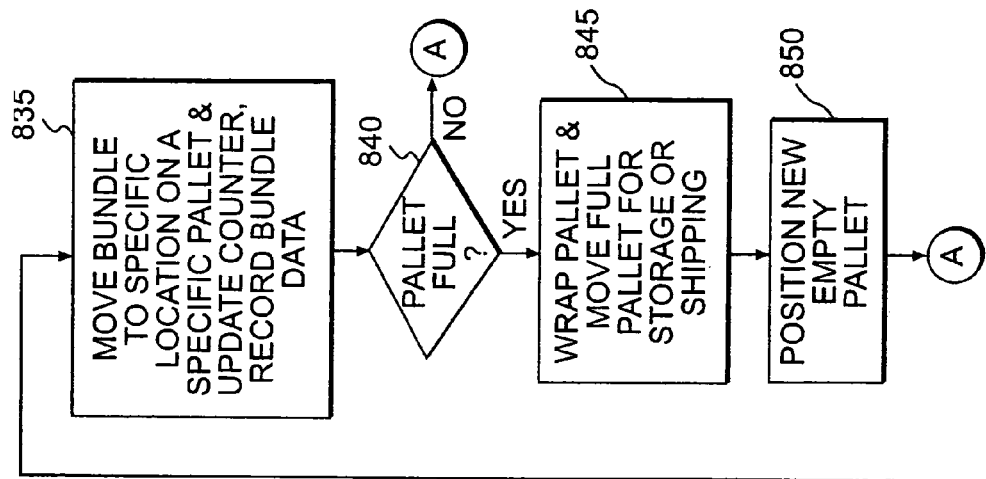
FIG. 8A is a flowchart showing the steps of building a pallet according to the embodiment of FIG. 3A.
Figure 8A:
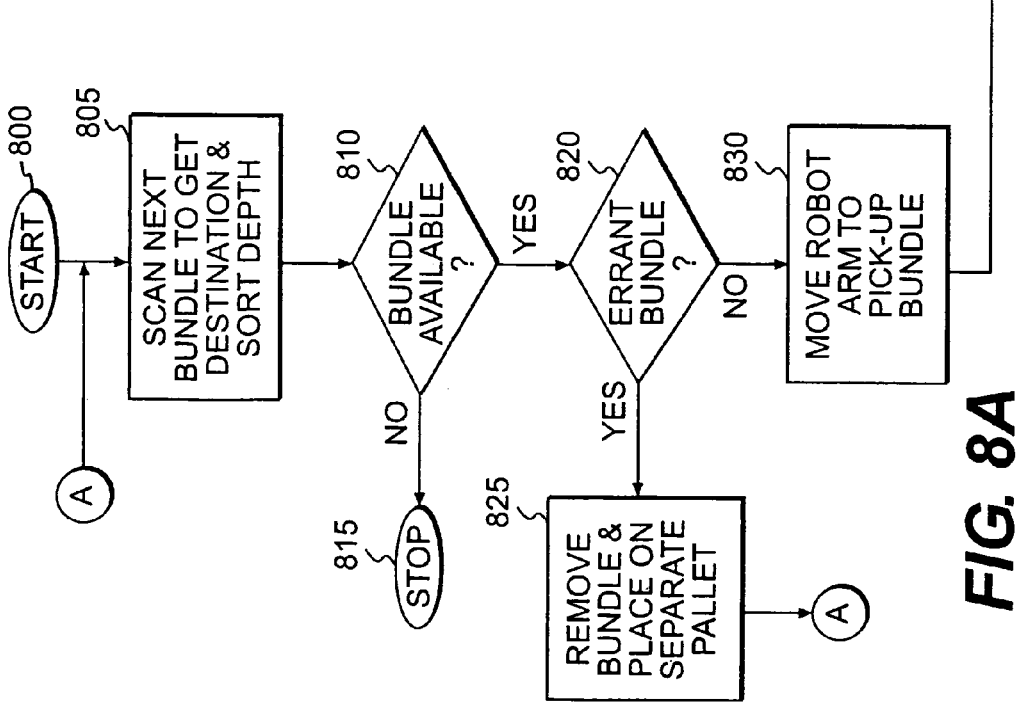
Figure 9:
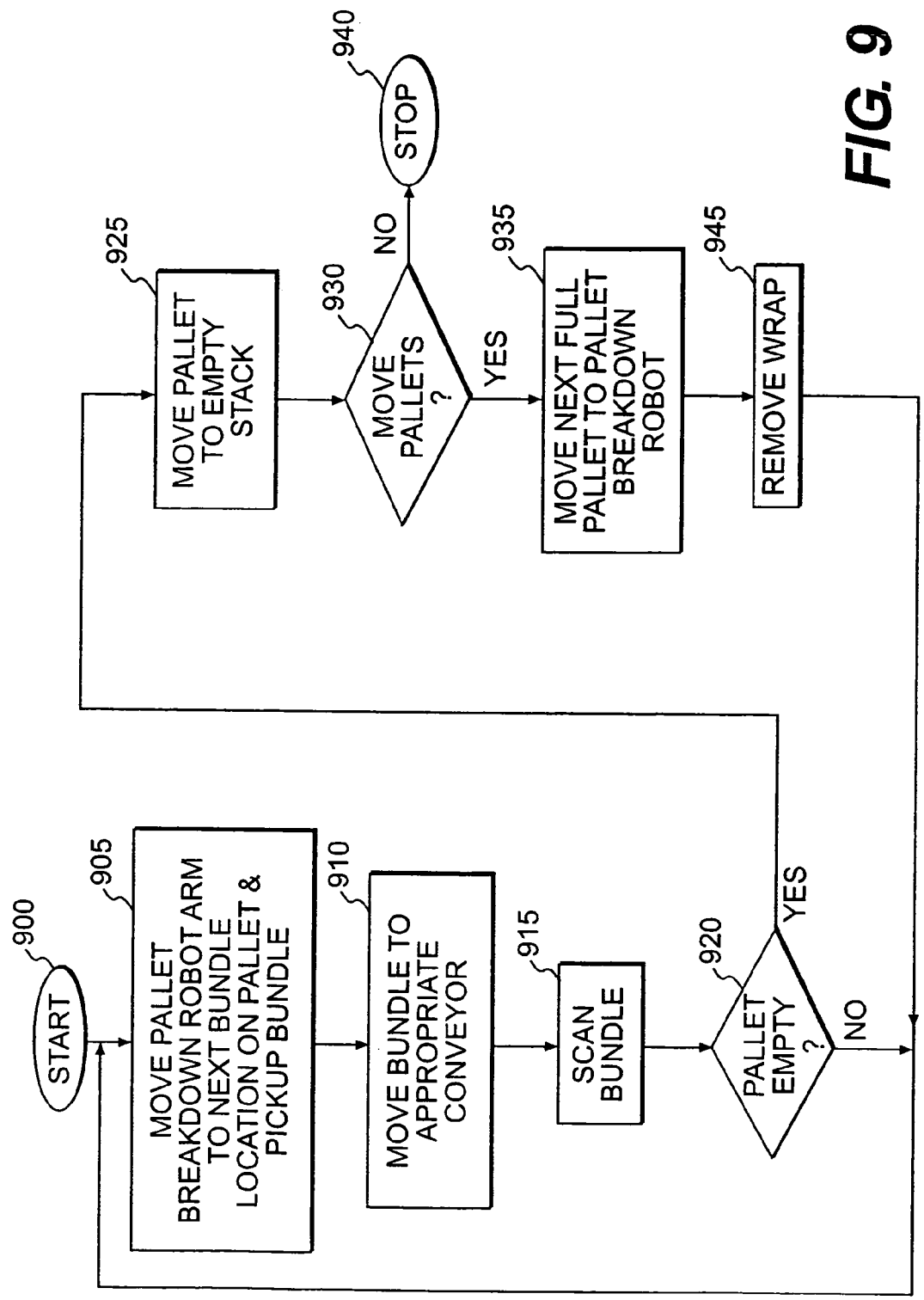
FIG. 9 is a flowchart showing steps to break down a pallet according to the embodiment of FIG. 4A.

The operation of the robotic palletizer, as depicted in the embodiment of FIG. 3A, is controlled by a stored program controller, which can have various configurations, that also has access to postal destination data, available sorting plans and cost structures associated with the postal destination data, route data and sorting plans. Based on this information, the software can create the most cost efficient palletization schemes. The SPC logic control for managing the operation of the robotic palletizer is expressed in more detail in the flowchart of FIG. 8A. The steps of FIG. 8A (as well as the flowchart of FIGS. 8B and 9) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIGS. 8A–9 may equally represent high level block diagrams of the system of the present invention, implementing the steps thereof.

Referring now to FIG. 8A, at step 800 the system begins. At step 805, arriving bundles 115 on the conveyor 300 are scanned by a scanner 310, which provides the destination and sort depth of the bundle 115 to the SPC. At step 810, a check is made whether a bundle is available. If no bundle is available, the process suspends at step 815. Otherwise, another check is made at step 820 to determine whether there is an errant bundle which is one that has a conflicting or otherwise invalid destination or sort depth for the pallet that is being built. As shown at step 825, if there is an errant bundle, the errant bundle is removed and placed on a separate pallet for later disposition and perhaps later retrieved if a proper pallet with corresponding destination and sort depth as the errant bundle is subsequently built. At step 830, the robotic arm 306 is moved by the SPC to pick-up a bundle 115. At step 835, the bundle is moved from its original location to a specific location on the proper pallet and a counter is updated to reflect the new count of bundles for that pallet. The location allocation data to reflect the used spot within the pallet is also updated. The destination and sort depth is recorded if not previously stored in the SPC memory. Time of palletization for the bundle 115 may also be recorded. At decision block 840, a check is made whether the pallet is full. If it is not full, the next bundle 115 is processed, shown at step 805. Otherwise, a full pallet is moved for storage or shipping to a postal facility at step 845. Processing continues at step 850, where a new empty pallet is positioned so another bundle can be built. The control flow returns to process the next bundle at step 805.

FIG. 8B is a flow diagram reflecting the availability of printouts, reports, and summaries from the SPC, which begins at step 870. At step 875, a shipping summary can be generated on request by a user or can be produced automatically, as needed. The shipping summary includes, for example, detailed data on the bundles per pallet, destination codes and sort depths, carriers for transport, time data, and cost information, amongst other information. At step 880, an inventory report can also be requested or automatically produced reflecting inventory on-hand at the mailer's facility and a projection of required pallets, packaging material, and transport requirements for the future. The report process ends at step 885.

FIG. 9 is a flow diagram of the embodiment of FIG. 4A showing the postal facility steps performed by pallet breakdown robot 355 under control of the postal facility SPC. Beginning at step 900, on an indication that a pallet is present either by sensor or manual input, the breakdown robot arm 360 is moved to the next bundle location within the pallet bundle arrangement and the bundle picked-up as shown at step 905. If this is the first bundle 115 from the pallet, the arm is moved to the first position for the pallet, which typically is the last position filled at the mailer's facility. The stacking arrangements are, in embodiments, in a pre-determined sequence. The stacking arrangement and content information (which may include pallet sort depth, destination codes, and bundle counts and the like) may be encoded on the pallet, itself, and also scanned for use by the postal facility SPC. At step 910, the bundle 115 is moved to an appropriate conveyor associated with the pallet. Scanner 375, as shown in step 915, next scans the bundle 115. The pre-encoded bundle information, placed on the bundle at the mailer's facility, includes the destination codes and sort depth of the bundle along with the bundle number and mailer's identification may be validated for the pallet. This information is stored in the postal facility SPC memories and communicated, as necessary, to the overall postal facility process control computers for diverting the bundle to the right destination for sorting and shipping. The computer topology may be of various configurations, which one skilled in the art would recognize. At step 920, a check is made whether the pallet is empty; if it is not, processing continues with the next bundle on the pallet at step 905. If the pallet is empty, the empty pallet is moved to an empty pallet stack or other designated place as shown at step 925. A check for more pallets is made at step 930. If no more pallets are available for processing, the sequence is finished at step 940. If more pallets are available, the next full pallet is moved to the pallet breakdown robot 355 as shown in step 935. The plastic wrap 121 is removed at step 945. This may be performed layer by layer to aid in pallet stability during the breakdown. Processing then resumes at step 905.

While the invention has been described in terms of preferred embodiments, those skilled in the art will recognize that the invention can be practiced with modifications and in the spirit and scope of the appended claims.

Having thus described our invention, what we claim as new and desire by Letters Patent is as follows:

1. A control system for controlling a mechanism for stacking one or more bundles onto one or more pallets, comprising:
    a first controller for storing bundle information associated with the one or more bundles;
    a second controller for controlling a scanner which scans the bundle information;
    a third controller for determining the availability and errant bundle information associated with the one or more bundles;
    a fourth controller for controlling a moving mechanism to load each of the one or more bundles to a predetermined pallet or location based on the bundle information, availability and errant bundle information; and
    a fifth controller for determining whether the pallet is full and if not determining a position of a non-filled pallet for moving a bundle of the one or more bundles.

2. The control system according to claim 1, further comprising a report controller for generating reports based on at least one of inventory and shipping information, detailed data on bundles per pallet, destination codes and sort depths, carriers for transport, time data, and cost information.

3. The control system according to claim 1, wherein the fourth controller controls the moving mechanism to move the each of the one or more bundles to a predetermined location on the predetermined pallet.

4. The control system according to claim 3, wherein the fourth controller includes a counter for counting the each of the one or more bundles moved to the predetermined pallet in order to prevent over filling of the predetermined pallet.

5. The control system according to claim 3, wherein the fourth controller determines when the predetermined pallet is full and determines a new position for the predetermined pallet.

6. A control system for controlling the breakdown of pallets into bundles, comprising:
    a first controller for storing bundle information associated with one or more bundles;
    a second controller for controlling a scanner which scans the bundle information;
    a third controller for controlling an unloading mechanism to move each of the one or more bundles to a predetermined conveyance system; and
    a fourth controller for determining whether the pallet is empty and moving the pallet to an empty pallet stack.

7. The control system according to claim 6, wherein the fourth controller determines whether there are any more pallets required to be broken down, wherein if there are more pallets to be broken down, the fourth controller controls a mechanism for moving a next pallet proximate to the unloading mechanism.

* * * * *